(12) United States Patent
Zhou et al.

(10) Patent No.: US 11,127,955 B2
(45) Date of Patent: Sep. 21, 2021

(54) ELECTRODE ASSEMBLY AND BATTERY

(71) Applicant: Ningde Amperex Technology Limited, Fujian (CN)

(72) Inventors: Lijian Zhou, Fujian (CN); Zhiwen Xiao, Fujian (CN)

(73) Assignee: NINGDE AMPEREX TECHNOLOGY LIMITED, Fujian (CN)

( * ) Notice: Subject to any disclaimer, the term of this patent is extended or adjusted under 35 U.S.C. 154(b) by 54 days.

(21) Appl. No.: 16/232,118

(22) Filed: Dec. 26, 2018

(65) Prior Publication Data

US 2019/0207223 A1     Jul. 4, 2019

(30) Foreign Application Priority Data

Dec. 28, 2017   (CN) .......................... 201711459391.3

(51) Int. Cl.
| | |
|---|---|
| *H01M 4/62* | (2006.01) |
| *H01M 4/36* | (2006.01) |
| *H01M 10/04* | (2006.01) |
| *H01M 50/572* | (2021.01) |
| *H01M 4/66* | (2006.01) |

(Continued)

(52) U.S. Cl.
CPC ........... *H01M 4/628* (2013.01); *H01M 4/366* (2013.01); *H01M 4/667* (2013.01); *H01M 10/0431* (2013.01); *H01M 50/572* (2021.01); *H01M 10/0525* (2013.01); *H01M 10/0587* (2013.01)

(58) Field of Classification Search
CPC ........ H01M 4/628; H01M 2/34; H01M 4/366; H01M 10/0431; H01M 10/0525; H01M 10/0587; H01M 4/667; H01M 50/572
See application file for complete search history.

(56) References Cited

U.S. PATENT DOCUMENTS

| 2009/0297929 A1* | 12/2009 | Uchida | ............. H01M 10/0431 429/94 |
|---|---|---|---|
| 2011/0274982 A1* | 11/2011 | Kaneko | ............. H01M 10/0569 429/303 |

(Continued)

FOREIGN PATENT DOCUMENTS

| CN | 203085704 U | 7/2013 |
|---|---|---|
| CN | 203150653 U | 8/2013 |

(Continued)

OTHER PUBLICATIONS

Office Action, CN201711459391.3, dated Jul. 2, 2021, 10 pgs.

*Primary Examiner* — Philip A. Stuckey
(74) *Attorney, Agent, or Firm* — Morgan, Lewis & Bockius LLP

(57) ABSTRACT

The present application provides an electrode assembly comprising a first electrode comprising a first current collector and a second electrode comprising a second current collector, wherein the first current collector comprises a first surface, the second current collector comprises a second surface, the first surface faces the second surface, and the second surface is provided with a conductive material. It is an object of the present application to provide an electrode assembly for improving short-circuit defects existing in the electrode assembly while ensuring resistance to mechanical abuse. The present application further provides a battery.

19 Claims, 3 Drawing Sheets

(51) Int. Cl.
*H01M 10/0525* (2010.01)
*H01M 10/0587* (2010.01)

(56) References Cited

U.S. PATENT DOCUMENTS

| | | | | |
|---|---|---|---|---|
| 2013/0004814 | A1* | 1/2013 | Ohashi | H01M 10/0431 |
| | | | | 429/94 |
| 2015/0037620 | A1* | 2/2015 | Nishi | H01M 10/0566 |
| | | | | 429/7 |
| 2017/0162913 | A1* | 6/2017 | Ohashi | H01M 10/0587 |
| 2017/0244129 | A1* | 8/2017 | Seong | H01M 2/0287 |
| 2019/0074550 | A1* | 3/2019 | Azuma | H01M 10/0431 |

FOREIGN PATENT DOCUMENTS

| | | |
|---|---|---|
| CN | 204045682 U | 12/2014 |
| CN | 105186028 A | 12/2015 |
| CN | 206225456 U | 6/2017 |

* cited by examiner

ELECTRODE ASSEMBLY AND BATTERY

CROSS-REFERENCE TO RELATED APPLICATIONS

The present application claims priority to Chinese Patent Application No. 201711459391.3, filed on Dec. 28, 2017, the content of which is incorporated herein by reference in its entirety.

FIELD OF THE INVENTION

The present application relates to the technical field of battery, in particular, to an electrode assembly and a battery.

BACKGROUND OF THE INVENTION

Lithium-ion batteries are widely used in consumer electronic products, such as mobile phones and notebook computers, because of their high energy density, long cycle life, and high open circuit voltage. In recent years, with the increase of the energy density of lithium-ion batteries, its application fields have gradually expanded to new fields such as electric vehicles. However, lithium-ion batteries have some unpredictable abuses during use, which seriously threaten consumers' safety. Therefore, the safety performance of lithium-ion batteries and their ability to withstand various abuse conditions seriously affect their large-scale applications.

Nail penetration is a more extreme case of internal short circuit in the case of abuse of the battery. When the battery is subjected to the nail penetration, the separator of lithium ion battery is often damaged, causing the internal short circuit of the battery to cause thermal runaway, so that the battery can no longer continue to be used normally, and in severe cases, damage may be caused to related devices or the personal safety of the operator may be endangered.

In related art, by applying a piece of extended aluminum foil on the tail (or head) of the positive electrode, applying a piece of extended copper foil on the tail (or head) of the negative electrode, and by extending the separator, then by surrounding the extended aluminum foil-separator-copper foil-separator arranged from the outside to the inside around the outer portion of the electrode assembly for one turn, the aluminum foil and the aluminum foil may be quickly short-circuited when the battery is penetrated by an external sharp conductor; by shunting the short-circuit current of the aluminum-anode and the anode-cathode to discharge the electric power inside the electrode assembly, the battery is prevented from catching fire, thus improving the safety of the battery.

There are still some problems with the related art.

First, in the production process, the empty foil area is filled with conductive particles (cathode anode particles, metal chips, etc.), which will penetrate the separator under the large pressure of the formation to cause short-circuit heating and even cause combustion.

Secondly, the edge burr area of the empty foil area is more likely to penetrate the separator, so compared with the active material area, since the empty foil area has no active material barrier, the edge burr may directly contact the separator, to increase the probability of short circuit, thereby causing the electrode assembly to generate heat.

Therefore, the technical problem to be solved by those skilled in the art is how to minimize or eliminate the internal short circuit caused by conductive particles and edge burrs penetrating the separator while ensuring the anti-abuse performance of the battery, especially under the premise of nail penetration safety.

SUMMARY OF THE INVENTION

In view of the problems in the related art, it is an object of the present application to provide an electrode assembly for improving short-circuit defects existing in the electrode assembly while ensuring resistance to mechanical abuse.

The present application provides an electrode assembly including: a first electrode including a first current collector; and a second electrode including a second current collector; wherein the first current collector includes a first surface, the second current collector includes a second surface, the first surface faces the second surface, and the second surface is provided with a conductive material.

The present application also provides a battery including: a battery case; and an electrode assembly sealed in the battery case, wherein the electrode assembly including: a first electrode including a first current collector; and a second electrode including a second current collector; wherein the first current collector includes a first surface, the second current collector includes a second surface, the first surface faces the second surface, and the second surface is provided with a conductive material.

The beneficial technical effects of the present application are as follows:

In the electrode assembly of the present application, the first surface on the first current collector and the second surface on the second current collector face each other, the second surface being provided with a conductive material; since the first surface has no electrode active material corresponding to the conductive material on the second surface, the conductive material on the second surface is in a no electron flowing state (i.e. due to there is no Li+ insertion/extraction of the second surface, so there is no electron flowing of the second surface) or a low state of charge (SOC) (i.e. maybe a few Li+ insert into the second surface from a other part of the second electrode, so the second surface is in a low SOC), thus even in the case of mechanical abuse, the first current collector and the second current collector may quickly form a short circuit, so that the internal power of the electrode assembly is discharged, thereby preventing the battery from exploding and igniting and ensuring the mechanical abuse resistance of the electrode assembly. At the same time, due to the arrangement of the conductive material, the conductive particles dropped during the production process are embedded in the conductive material, and the conductive material also hinders the edge burr of the current collector from penetrating the separator, so that an effect that the separator is not easily broken is caused, and the short-circuit defects existing in the electrode assembly are improved.

DETAILED DESCRIPTION OF THE PREFERRED EMBODIMENTS

Figure 1:
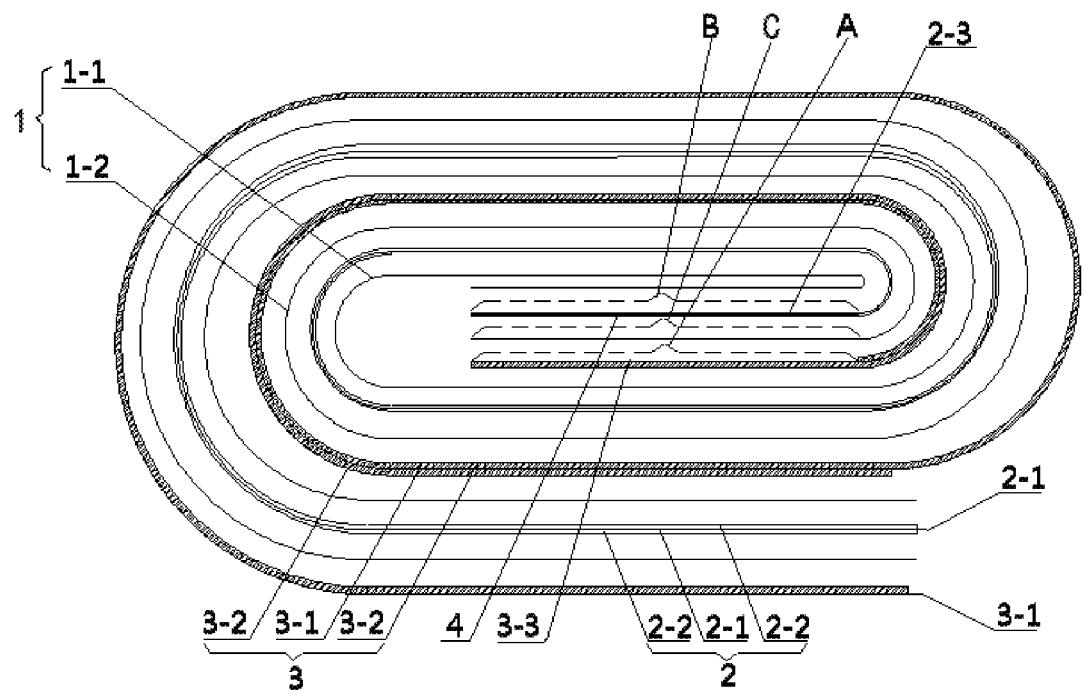
FIG. 1 is a schematic view of an electrode assembly disclosed by the embodiment of the present application.

The technical solutions in the present application are described in detail below through specific embodiments. As used herein, terms such as "internal and outer" are established based on the positional relationship shown in the drawings. Depending on the drawings, the corresponding positional relationship may also change accordingly. Therefore, this may not be understood as an absolute limitation on the scope of protection. And relationship terms such as "first" and "second" are used merely to distinguish one component from another having the same name, and do not necessarily require or imply any such actual relationship or order between the components.

With reference to FIGS. 1 to 5, in an embodiment, the present application provides an electrode assembly including a first electrode 3 including a first current collector 3-1 and a second electrode 2 including a second current collector 2-1, wherein the first current collector 3-1 includes a first surface 3-3, the second current collector 2-1 includes a second surface 2-3, the first surface 3-3 faces the second surface 2-3, and the second surface 2-3 is provided with a conductive material 4.

Specifically, the first surface 3-3 is located in a first region A of the first current collector 3-1, and the second surface 2-3 is located in a second region B of the second current collector 2-1; the first surface 3-3 may be provided with protective adhesive layer or arranged as a bare surface (in another word, an uncoated surface), and the second surface 2-3 is provided with a conductive material 4. It is to be understood that a separator section C of a separator 1 may be arranged between the first surface 3-3 and the second surface 2-3. Here, "the first and second surfaces facing each other" means that the first surface 3-3 and the second surface 2-3 face each other face by face. The first surface 3-3 and the second surface 2-3 may be separated by only one layer of the separator 1 without excess current collectors, and without other solid materials or structures such as conductive materials and active materials other than the "conductive material provided on the second surface", an electrolyte or air may be placed therebetween. In the electrode assembly of the present application, the first surface 3-3 on the first current collector and the second surface 2-3 on the second current collector face each other, and the first surface 3-3 is arranged as a bare surface (in another word, an uncoated surface), the second surface 2-3 being provided with a conductive material; since the first surface 3-3 in the first region A has no electrode active material corresponding to the conductive material on the second surface 2-3 in the second region B, the conductive material on the second region B is in a no electron flowing state (i.e. due to there is no Li+ insertion/extraction of the second surface, so there is no electron flowing of the second surface) or a low state of charge (SOC) (i.e. maybe a few Li+ insert into the second surface from a other part of the second electrode, so the second surface is in a low SOC), thus even in the case of mechanical abuse, the first current collector 3-1 and the second current collector 2-1 may still quickly form a short circuit, so that the internal power of the electrode assembly is discharged, thereby preventing the battery from exploding and igniting and ensuring the mechanical abuse resistance of the electrode assembly. At the same time, due to the arrangement of the conductive material 4 or the protective adhesive layer 5, the conductive particles dropped during the production process are embedded in the conductive material 4, and the conductive material 4 also hinders the edge burr of the current collector from penetrating the separator 1, so that an effect that the separator 1 is not easily broken is caused, and the short-circuit defects existing in the electrode assembly are improved.

According to an embodiment of the present application, the first electrode 3 is an anode or a cathode, and correspondingly, the second electrode 2 is a cathode or an anode.

In an embodiment illustrated, the first region A is configured as a continuous portion of the first current collector 3-1, the second region B is configured as a continuous portion of the second current collector 2-1, and the separator section C is configured as a continuous portion of the separator 1. The separator 1 includes a first layer of separator 1-1 and a second layer of separator 1-2. The first layer of separator 1-1 and the second layer of separator 1-2 may be made of PP or PE. The number of layers of separator 1 may be set according to the actual needs of the manufacture of the electrode assembly, and is not particularly limited herein.

According an embodiment, the conductive material 4 includes at least one of selected from the group composed of a conductive cathode active material and a conductive anode active material. The conductive anode active material may be one or more of artificial graphite, natural graphite, amorphous carbon, hard carbon, and the like; the conductive cathode active material may be one or more of lithium cobaltate, lithium manganate, a lithium nickel cobalt manganese oxide, and lithium iron phosphate. The advantage of using an electrode active material as the conductive material 4 is that in the process of manufacturing the electrode assembly to form the electrode, another section of the electrode active material is coated directly on a region of the current collector where the bare surface (in another word, an uncoated surface) is originally formed, so as to quickly form the second region B and the conductive material thereon, thereby eliminating the complicated process of coating other conductive materials to simplify the process and save costs. It is to be understood that if there are other special needs, the conductive material 4 may also be other inactive conductive materials. In order to distinguish from other coated active materials on the second current collector 3-1, a black filled region in the figure is used to identify conductive material 4.

With reference to FIGS. 1 to 4, in an embodiment, the first current collector 3-1 further includes a third surface (to avoid confusion with the first surface, the third surface is not labeled in the figures), the third surface is arranged opposite to the first surface 3-3, and the third surface is provided with a first electrode active material 3-2. That is, the third surface and the first surface 3-3 are the front and back sides of the first current collector 3-1. It is to be understood that in other embodiments, the third surface may not be provided with the first electrode active material 3-2. Specifically, when the third surface is provided with the first electrode active material 3-2, the first region A forms a single-sided empty foil; when the third surface is not provided with the first electrode active material 3-2, the first region A forms a double-sided empty foil.

Further, the second current collector 2-1 further includes a fourth surface (to avoid confusion with the second surface, the fourth surface is not labeled in the figures), the fourth surface is arranged opposite to the second surface 2-3, and the fourth surface is provided with a second electrode active material 2-2. That is, the fourth surface and the second surface 2-3 are the front and back sides of the second current collector 2-1. It is to be understood that in other embodiments, the fourth surface may not be provided with the second electrode active material 2-2. Specifically, when the fourth surface is provided with the second electrode active material, the second region B forms a double-sided electrode; when the fourth surface is not provided with the second electrode active material 2-2, the second region B forms a single-sided electrode. It can be understood that the two cases of the first region A and the two cases of the second region B may be arbitrarily arranged and combined.

In the embodiments illustrated in FIGS. 1-4, the first electrode 3 is a cathode and the second electrode 2 is an anode. Correspondingly, the first current collector 3-1 is an aluminum foil, the second current collector 2-1 is a copper foil, the first electrode active material 3-2 is a cathode active material, the second electrode active material 2-2 is an anode active material, and the conductive material 4 is an anode active material. It is to be understood that this is merely an embodiment embodied for the purpose of example, and in other optional embodiments, the properties of the first electrode 3 and the second electrode 2 may be interchanged, and accordingly, the properties of the other components described above may also be interchanged.

In the embodiments illustrated in FIGS. 1-4, the electrode assembly is a wound-type electrode assembly. The basic structure of the wound-type electrode assembly is a wound-type electrode assembly fabricated according to a conventional process in the art. It is of course understood that the present application has been improved in the basic structure described above or below.

Figure 2:
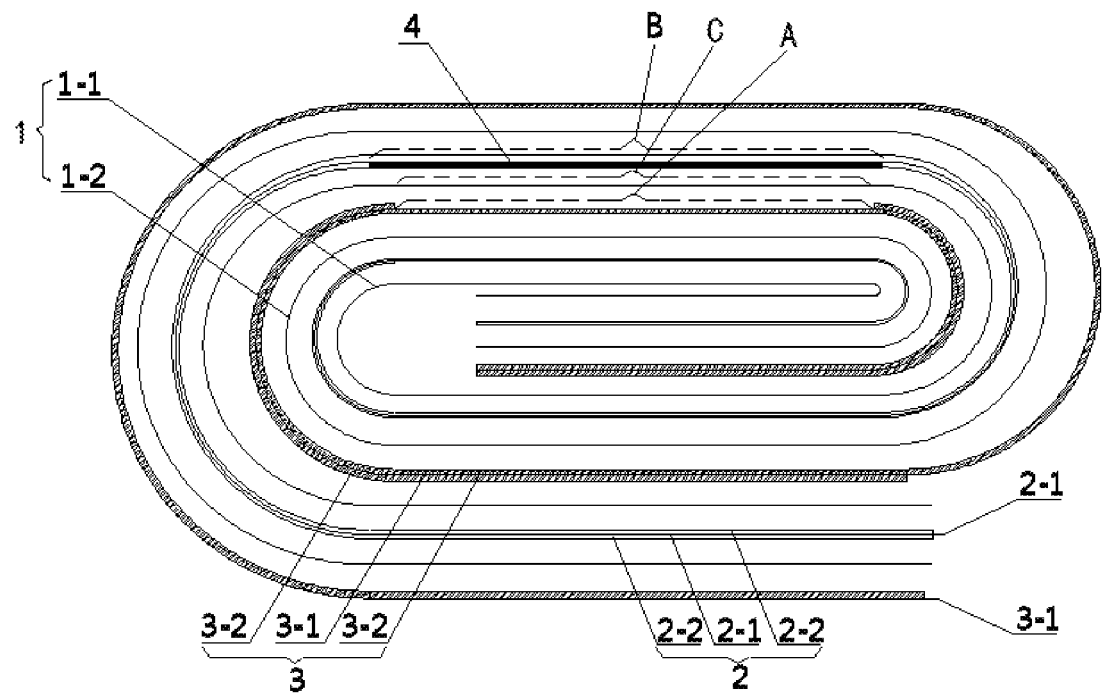
FIG. 2 is a schematic view of another electrode assembly disclosed by the embodiment of the present application.
Figure 3:
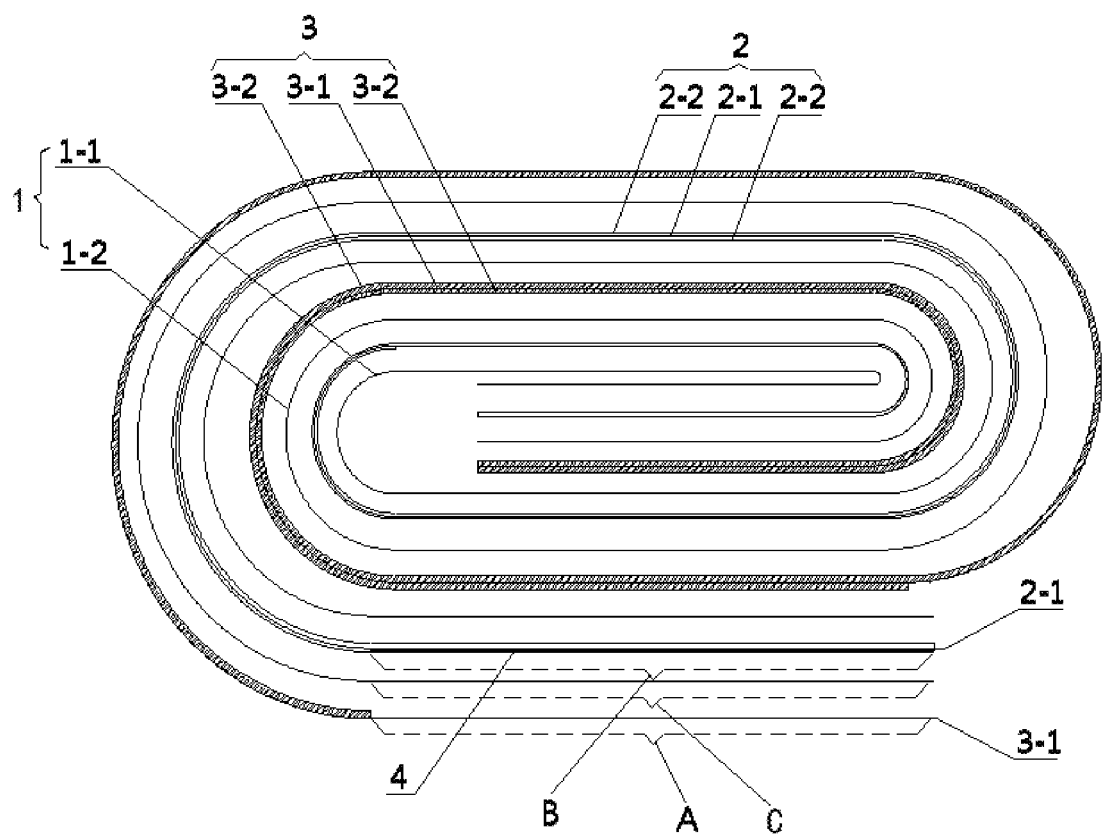
FIG. 3 is a schematic view of still another electrode assembly disclosed by the embodiment of the present application.

In an embodiment of a wound-type electrode assembly, the first surface 3-3 and the second surface 2-3 (i.e., the first region A and the second region B) are located in the inner portion of the wound-type electrode assembly (as shown in FIG. 1); or the first surface 3-3 and the second surface 2-3 (i.e., the first region A and the second region B) are located in the middle portion of the wound-type electrode assembly (as shown in FIG. 2); or the first surface 3-3 and the second surface 2-3 (i.e., the first region A and the second region B) are located in the outer portion of the wound-type electrode assembly (as shown in FIG. 3). This is merely a plurality of embodiments that vary depending on the position of the first surface 3-3 and the second surface 2-3 in the wound-type electrode assembly. In general, however, the separator section C, the first surface 3-3 and the second surface 2-3 (i.e., the first region A and the second region B) include planar portions of the wound-type electrode assembly.

Figure 4:
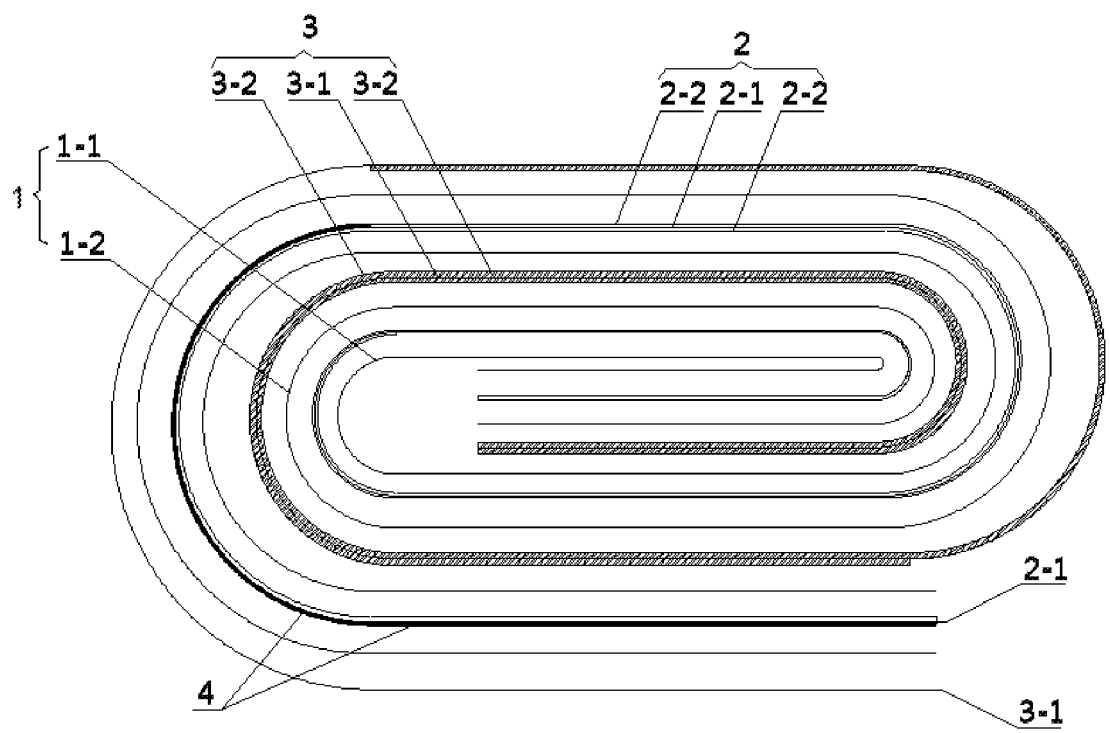
FIG. 4 is a schematic view of still another electrode assembly disclosed by the embodiment of the present application.

In a further variation, as shown in FIG. 4, the first surface 3-3 and the second surface 2-3 include planar and arcuate portions of the wound-type electrode assembly; this embodiment may also be considered to be formed by extending the first surface 3-3 and the second surface 2-3 to the arcuate portions on the basis of the embodiment shown in FIG. 3. In a still further variation, the first surface 3-3 and the second surface 2-3 surround the wound-type electrode assembly at least one or more turns in the circumferential direction, and it is possible to determine whether the cathode is outside or the anode is outside in the structure according to the needs of the coating film. Although this embodiment is shown in the figures, it is not difficult to understand the structure according to the ideas and variation trends of the foregoing embodiments. It should be understood that the separator section C also changes as the position of the first surface 3-3 and the second surface 2-3 changes.

In juxtaposition with the embodiment of the wound-type electrode assembly, the electrode assembly may be a laminated electrode assembly. The basic structure of the laminated electrode assembly is a laminated electrode assembly fabricated according to a conventional process in the art. It is of course understood that the present application has been improved in the basic structure as described above.

For those skilled in the art, as the contact between the aluminum foil and the fully charged anode is dangerous, in the structure of the related art in which a piece of extended aluminum foil is arranged on the tail (or head) of the positive electrode, a piece of extended copper foil is arranged on the tail (or head) of the negative electrode, the separator is extended, and the outer portion of the electrode assembly is surrounded by the extended aluminum foil-separator-copper foil-separator arranged from the outside to the inside for one turn, the second surface 3-3 of the second current collector (e.g., one surface of the copper foil) is not coated with an anode material or other conductive materials. In this regard, the present application does the opposite. That is, the second surface 3-3 of the above structure is coated with the conductive material 4. Then, since the opposite first current collector 3-1 (e.g., aluminum foil) is not coated with the cathode material, the second region B may be in a no electron flowing state (i.e. due to there is no Li+ insertion/extraction of the second surface, so there is no electron flowing of the second surface) or a low state of charge (SOC) (i.e. maybe a few Li+ insert into the second surface from a other part of the second electrode, so the second surface is in a low SOC) due to the lack of corresponding cathode if the conductive material coated to the second current collector 2-1 is the anode material 2-2. If the conductive material arranged in the second current collector 2-1 is another inactive conductive material, its function is only equivalent to the conductive current collector, and thus the safety is relatively high. First, since the material has a short-circuit resistance smaller than the short-circuit resistance value of Al-anode, it is ensured that the current may preferentially flow through the Al-conductive material-Cu, and the short-circuit current of the Al-anode short-circuit is shared; second, the resistance value thereof is greater than the Al—Cu short-circuit resistance value, which may reduce the overall heat generation of the electrode assembly; finally, the material has better thermal stability than the fully charged anode, which improves the safety of the short circuit point.

After the structure in each of the above embodiments is employed, when the electrode assembly encounters an impact such as nailing, the aluminum foil and anode (Al-Anode) still quickly forms a short circuit, so that the internal power of the electrode assembly is discharged, thereby preventing the battery from exploding and igniting and ensuring the mechanical abuse resistance of the electrode assembly, especially the safety of the nail penetration. Moreover, since the copper foil is coated with the conductive material 4, the conductive particles or edge burrs are embedded in the conductive material 4 under the barrier effect of the conductive material 4 and hence are not easy to penetrate the separator, thereby reducing or eliminating the possibility of edge burrs and conductive particles penetrating the separator, then the internal short-circuit defects caused by conductive particles or edge burrs penetrating the separator may be significantly reduced or eliminated, therefore the safety performance of the lithium ion battery may be improved.

It should be noted here that the first region A described herein is a current collector region in which the electrode active material is not coated. The conductive material of the second region B may substantially or completely cover the first region A on the projection.

The above embodiments are only embodiments of the present application, and are not limited thereto. On this basis, adjustments may be made according to actual needs, thereby obtaining different implementations. For example, the first layer of separator 1-1 and the second layer of separator 1-2 may be connected to each other as one separator; or, the electrode assembly may be wound into other shapes, and the like. Since there are many ways to implement, examples for each one will not be illustrated here.

Figure 5:
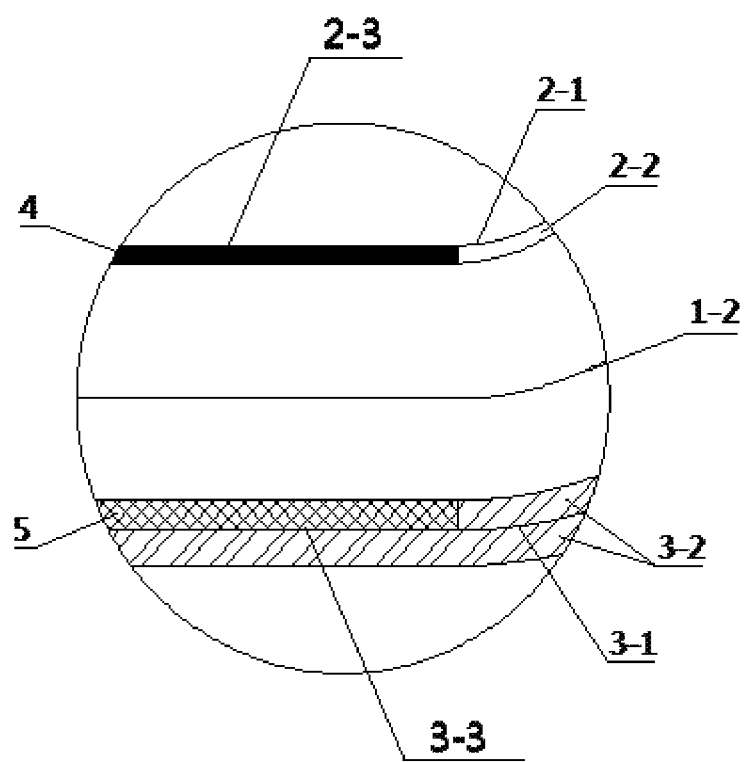
FIG. 5 is a partial enlarged view of the electrode assembly of FIG. 1 after a protective adhesive layer is arranged on a first surface thereof.

With reference to FIG. 5, another embodiment of the electrode assembly of the present application is shown. The difference between the embodiment shown in FIG. 5 and the embodiment shown in FIGS. 1 to 4 lies in modifying the first surface 3-3 of the electrode assembly from a bare surface (in another word, an uncoated surface) to a first surface 3-3 provided with a protective adhesive layer 5. FIG. 5 is a partial enlarged view of the right end of the first surface after the first surface 3-3 is pasted with a protective adhesive layer 5. Specifically, the first surface 3-3 may be provided with a protective adhesive layer 5 according to requirements, for example, is adhered with a layer of protective adhesive, to perform adhesive-adhering protection. After the protective adhesive layer 5 is provided, since the protective adhesive layer 5 may hinder the first region A and the second region B from forming a short circuit in time, there may be a slight deterioration in the impact of nail penetration. However, the conductive material on the second region B may also be caused to be in a no electron flowing state (i.e. due to there is no Li+ insertion/extraction of the second surface, so there is no electron flowing of the second surface) or a low state of charge (SOC) (i.e. maybe a few Li+ insert into the second surface from a other part of the second electrode, so the second surface is in a low SOC) while also hindering the conductive particles and the collector edge burrs from penetrating the separator 1, further reducing the internal short circuit caused by burrs and conductive particles in the electrode assembly process while ensuring anti-mechanical abuse performance. It can be seen that the embodiment shown in FIG. 5 and the embodiments shown in FIGS. 1 to 4 belong to a general inventive concept. Another aspect of the present application is to provide a battery including a battery case and an electrode assembly sealed in the battery case as well as a first electrode tab and a second electrode tab (not shown), wherein the electrode assembly is an improved electrode assembly in the above embodiments, the first electrode tab is electrically connected to the first current collector 2-1 of the electrode assembly, and the second electrode tab is electrically connected to the second current collector 3-1 of the electrode assembly. Please refer to the existing technology for the rest of the structure, which will not be repeated herein.

The above is merely illustrative of the preferred embodiments of the present application and is not intended to be limiting of the present application, and various changes and modifications may be made by those skilled in the art. Any modifications, equivalent substitutions, improvements, and the like within the spirit and principles of the application are intended to be included within the scope of the present application.

What is claimed is:

1. An electrode assembly comprising:
   a first electrode comprising a first current collector;
   a second electrode comprising a second current collector; and
   a separator separating the first electrode and the second electrode;
   wherein the first current collector comprises a first surface in direct contact with a protective adhesive layer, the second current collector comprises a second surface, the first surface in direct contact with the protective adhesive layer faces the second surface, the second surface is provided with a conductive material, the first surface facing the second surface is in direct contact with the protective adhesive layer, and a first portion of the second surface opposite to and facing the protective adhesive layer is in a state of charge (SOC) that is lower than a SOC of a second portion of the second surface that is not opposite to or facing the protective adhesive layer.

2. The electrode assembly according to claim 1, wherein the conductive material comprises at least one of selected from the group composed of a conductive cathode active material and a conductive anode active material.

3. The electrode assembly according to claim 1, wherein the first current collector further comprises a third surface arranged opposite to the first surface, and the third surface is provided with a first electrode active material.

4. The electrode assembly according to claim 1, wherein the second current collector further comprises a fourth surface arranged opposite to the second surface, and the fourth surface is provided with a second electrode active material.

5. The electrode assembly according to claim 1, wherein the first surface is arranged as an uncoated surface.

6. The electrode assembly according to claim 1, wherein the first electrode is a cathode electrode, and the second electrode is an anode electrode.

7. The electrode assembly according to claim 6, wherein the first current collector is an aluminum foil, the second current collector is a copper foil, and the conductive material is an anode active material.

8. The electrode assembly according to claim 1, wherein the electrode assembly is a wound-type electrode assembly.

9. The electrode assembly according to claim 8, wherein the first surface and the second surface are located on an outer portion of the wound-type electrode assembly.

10. The electrode assembly according to claim 8, wherein the first surface and the second surface are located on a middle of the wound-type electrode assembly.

11. The electrode assembly according to claim 8, wherein the first surface and the second surface are located on an inner portion of the wound-type electrode assembly.

12. The electrode assembly according to claim 8, wherein the first surface and the second surface comprise a planar portion of the wound-type electrode assembly.

13. The electrode assembly according to claim 8, wherein the first surface and the second surface comprise planar and arcuate portions of the wound-type electrode assembly.

14. The electrode assembly according to claim 8, wherein the first surface and the second surface surround at least one turn of the wound-type electrode assembly.

15. The electrode assembly according to claim 1, wherein the electrode assembly is a laminated electrode assembly.

16. A battery, comprising:
   a battery case; and
   an electrode assembly sealed in the battery case, and the electrode assembly comprising:
   a first electrode comprising a first current collector;
   a second electrode comprising a second current collector; and
   a separator separating the first electrode and the second electrode;
   wherein the first current collector comprises a first surface in direct contact with a protective adhesive layer, the second current collector comprises a second surface, the first surface in direct contact with the protective adhesive layer faces the second surface, and the second surface is provided with a conductive material, the first surface facing the second surface is in direct contact with the protective adhesive layer, and a portion of the second surface opposite to and facing the protective adhesive layer is in a state of charge (SOC) that is lower than a SOC of a second portion of the second surface that is not opposite to or not facing the protective adhesive layer.

17. The battery according to claim 16, wherein the conductive material comprises at least one of a conductive cathode active material and a conductive anode active material.

18. The battery according to claim 16, wherein the first current collector further comprises a third surface arranged opposite the first surface, and the third surface is provided with a first electrode active material.

19. The battery according to claim 16, wherein the second current collector further comprises a fourth surface arranged opposite the second surface, and the fourth surface is provided with a second electrode active material.

* * * * *